United States Patent [19]

Barnes

[11] 4,097,009
[45] Jun. 27, 1978

[54] AIRCRAFT RAMP DOOR

[75] Inventor: Franklin K. Barnes, Redmond, Wash.

[73] Assignee: The Boeing Company, Seattle, Wash.

[21] Appl. No.: 791,228

[22] Filed: Apr. 27, 1977

[51] Int. Cl.² .................................................. B64C 1/14
[52] U.S. Cl. .................................. 244/129.5; 49/254;
244/137 R; 292/302
[58] Field of Search ............ 244/137 R, 118 R, 129.5;
49/254; 214/85, 85.1; 296/57 R; 105/406 A;
292/300, 302

[56] References Cited

U.S. PATENT DOCUMENTS

| 2,942,812 | 6/1960 | Pauli | 244/118 R |
| 3,544,046 | 12/1970 | Belolipetsky et al. | 244/129.5 X |
| 3,718,171 | 2/1973 | Godwin | 244/129.5 X |

Primary Examiner—Barry L. Kelmachter
Attorney, Agent, or Firm—Thomas H. Murray

[57] ABSTRACT

A ramp door hinged along the forward edge of a cargo door opening in the fuselage of an aircraft is retained in a locked position until the abutting end of a cargo door is pivoted into the aircraft about a hinge along the aft edge of the opening. Cylindrical pins extend from brackets on the fuselage at spaced-apart locations along each side of the ramp door opening. The pins pass into eyelet openings in spaced-apart upstanding hanger members supported by the ramp door. The hinge for the ramp door includes crank arms coupled with a hydraulic actuator used to move the ramp door with a translating motion in an aft direction to disengage the hanger members from the support pins. This translating movement of the ramp door is required as an initial measure for lowering the ramp door but inhibited so long as the cargo door remains in a closed position.

14 Claims, 4 Drawing Figures 4,097,009

AIRCRAFT RAMP DOOR

BACKGROUND OF THE INVENTION

This invention relates to the combined use of a ramp door and cargo door for sealing a cargo door opening in the fuselage of an aircraft, and more particularly the present invention relates to pivotally supporting a ramp door and a cargo door in a manner so that abutting edges of these doors, when closed, inhibit unlocking of interfitting locking members carried by the fuselage and the ramp door until the cargo door has undergone repositioning into the fuselage after which the ramp door is moved with a translating motion in the aft direction of the aircraft to disengage the interfitting locking members to permit pivotal opening of the ramp door.

As is known in the art, existing aircraft with an outwardly-opening ramp door, utilize one of various different methods for securing the door along its edges against the internal pressure developed by the aircraft while in flight. The known methods for securing the ramp door at its edges all employ mechanical devices such as hooks, pins, etc. carried for movement by support members. Auxiliary means are also required to prevent inadvertent unlocking movement of the locking device for the ramp door. While the known forms of locking devices are made highly reliable and safe, improved safety and less parts will enable securing a ramp door to the fuselage of an aircraft in a manner which is far less susceptible to errors during installation and readjustments to compensate for wear and the like.

It is also known in the art to provide a two-cargo door arrangement consisting of a ramp door and an aft cargo door. The aft cargo door sometimes also referred to as a plug-type cargo door opens inwardly into the fuselage of the aircraft while the ramp door which is a non-plug type of door, is moved so that one end of the door is lowered toward the ground outwardly from the aircraft. This two-door arrangement is conventional and is presently employed on numerous forms of aircraft. Articulated latches along the side edges of the ramp door are used to retain the ramp door in a closed position. However, costly fail-safe measures are required to prevent inadvertent opening of the ramp door when the aircraft is pressurized.

SUMMARY OF THE INVENTION

It is an object of the present invention to provide an improved arrangement of parts in an aircraft for retaining a loading ramp door in a closed position without articulated latches along the side edges of the door.

It is a further object of the present invention to provide an improved arrangement of parts for an aircraft to retain a loading ramp door in a closed position with inherently greater safety by preventing opening of the ramp door when the aircraft is pressurized so long as an abutting and cooperatively-arranged aft cargo door is closed.

It is still another object of the present invention to provide interlocking stationary members on a ramp door and a fuselage of an aircraft which are engaged and disengaged by a translating movement of the ramp only in the event of a remote positioning of a cargo door which, in the closed position, inhibits such translating movement to thereby prevent inadvertent opening of the ramp door while at the same time providing that the aft cargo door cannot be opened at a significant internal aircraft pressure above which safety of a flight might otherwise be affected.

In accordance with the present invention, there is provided an aircraft having a fuselage with a cargo door opening therein, a ramp door to seal at least a part of the opening including the combination of hinge means to pivotally connect the ramp door to the fuselage of the aircraft, stationary ramp support means carried by the fuselage at spaced-apart locations along opposite sides of the cargo door opening, stationary carrier members on the ramp door for interlocking engagement with the support means, and actuator means coupled with the hinge means to move the ramp door with a translating motion from a forward-door sealing position wherein the carrier members are interlocked with the ramp support means into an unlocked aft position wherein the carrier members are disengaged from the ramp support means.

In the preferred form of the present invention, the aforementioned carrier members include upstanding hanger members each having eyelet openings adapted to receive a cylindrical pin member forming the aforesaid ramp support means. The hinge means for the ramp door includes a pivot shaft carried by the ramp door and crank means supported by the fuselage while interconnecting the pivot shaft and the actuator used to effect the translating motion of the ramp door from the forward-door sealing position to the unlocked aft position. An aft cargo door is attached by hinge means along the aft edge of the opening in the fuselage. By this arrangement of parts, the aft cargo door must be initially moved from an abutting relation with the ramp door to provide the necessary space for aft movement of the ramp door.

These features and advantages of the present invention as well as others will be more readily understood when the following description is read in light of the accompanying drawing, in which.

Figure 1:
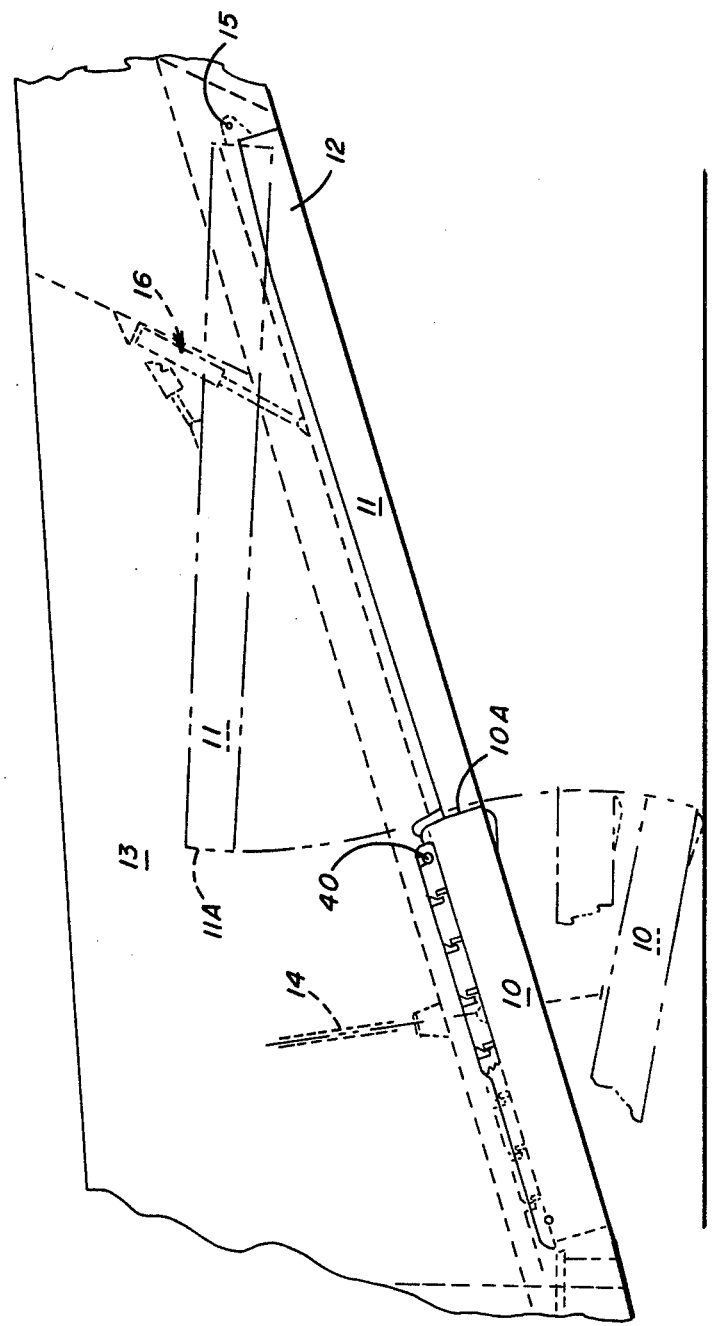
FIG. 1 is an elevational view of the aft portion of an aircraft wherein a cargo door opening is sealed by the cooperative relation of a ramp door and an aft cargo door embodying the features of the present invention.

FIG. 1 illustrates the general arrangement of a ramp door 10 and an aft cargo door 11 that are hinged along the forward and aft edges, respectively, of a cargo door opening 12 formed in the fuselage 13 of an aircraft. The combined length of doors 10 and 11 corresponds essentially to the length of opening 12. The aircraft fuselage 13 is diagrammatically illustrated and as will be clearly understood by those skilled in the art, the opening 12 is located in the aft portion of the fuselage toward the tail. The ramp door 10 is pivotally supported by an arrangement of parts to be more specifically described hereinafter along its forward edge to the fuselage of the aircraft. The door 10 is raised into an enclosing relation with part of the opening 12 by an actuator 14 in the form of a piston and cylinder assembly. The aft cargo door 11 is connected along its aft edge by a hinge pin 15 for pivotal movement from an enclosing relation wherein the forward edge 11A of the cargo door 11 is located in an abutting relation with the aft edge 10A of the ramp door 10. The aft cargo door 11 is pivoted about hinge pin 15 so that the forward edge 11A is moved within the fuselage of the aircraft by an actuator 16 in the form of a piston and cylinder. An important aspect of the present invention resides in the fact that the actuator 16 to the aft cargo door 11 is designed so that the cargo door cannot be opened at a significant internal body pressure above which the safety of flight might be affected if the door were to be opened suddenly. The actuator is sized to limit the force developed by the actuator to pivotally move the aft cargo door from the closed position. When the aft cargo door is in the closed position, according to the present invention, the ramp door 10 is retained in a closed position because the ramp door must be first translated in an aft direction within the cargo door opening 12 before lowering of the ramp door can take place. The translating motion of the ramp door in an aft direction is necessary for the disengagement of interfitting ramp support members used to secure the ramp door at spaced-apart locations along its opposite sides to the fuselage of the aircraft.

Figures 2, 3:
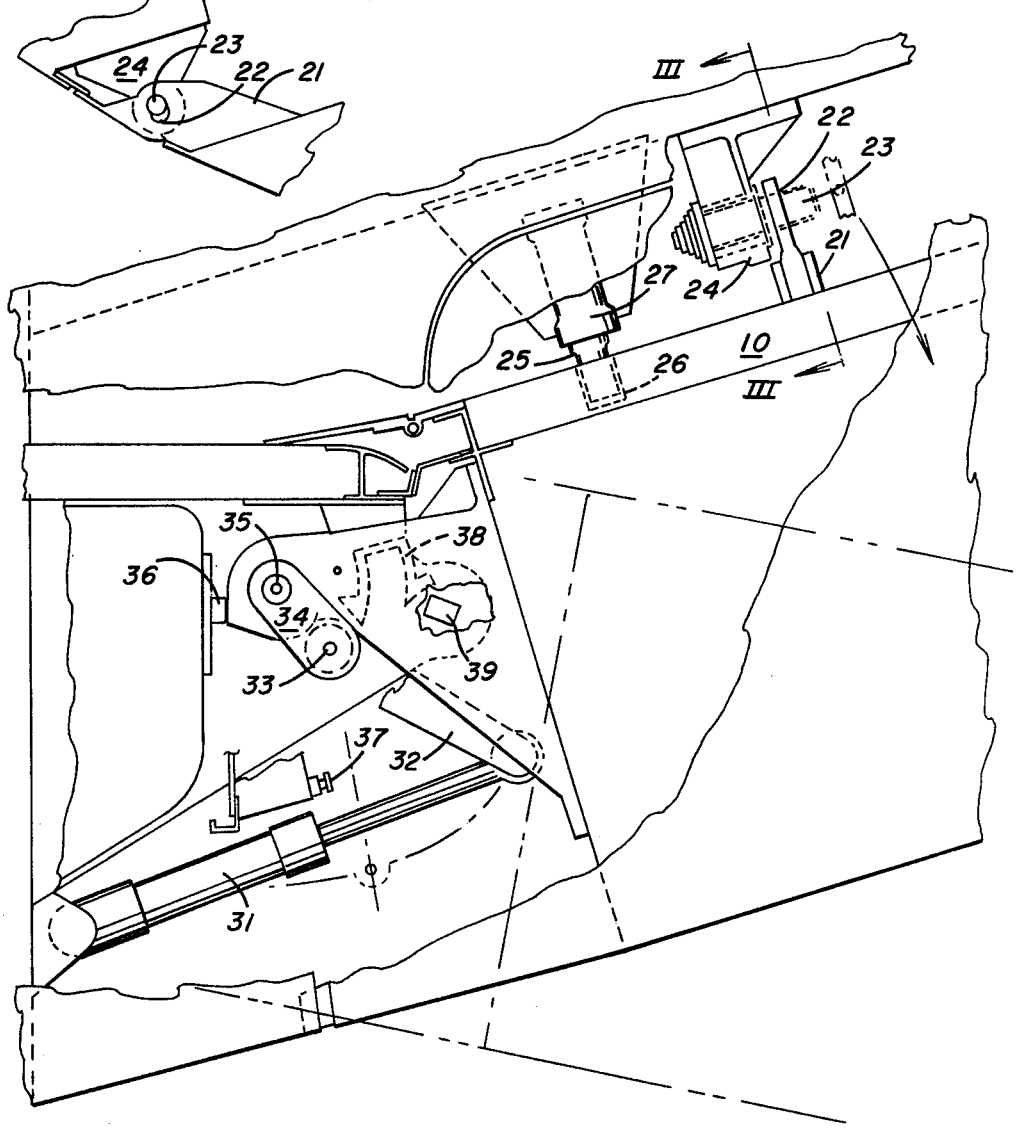
FIG. 2 is an enlarged view of locking and hinge mechanisms for the ramp door shown in a locked position.
FIG. 3 is a sectional view taken along line III-III of FIG. 2.

As shown in FIGS. 2 and 3, upstanding support members 21 project upwardly at spaced-apart locations along the side edges of the ramp door. The support members are secured in a rigid stationary manner to the ramp door. An eyelet opening 22 in the upper end of each support member is adapted to receive a cylindrical pin 23 which is, in turn, supported by a bracket 24 rigidly secured to the fuselage of the aircraft. The pin 23 projects from bracket 24 so that the free end of the pin is located in an aft direction with respect to the bracket. Eccentric sleeves are preferably interposed between the pin and the bracket for adjustable positioning of the pin for proper engagement with the eyelet opening 22 in the upstanding bracket 21. In the event the ramp door is designed to aid in the support of shear loads of the body structure of the fuselage, then shear fittings are provided. As shown in FIG. 2, a shear fitting 25 is supported by the fuselage of the aircraft for movement toward and away from a socket opening 26 by an actuator 27. When the ramp door is designed for a non-shear load carrying function, then the shear fittings will be eliminated with no reduction to safety of the door.

Figure 4:
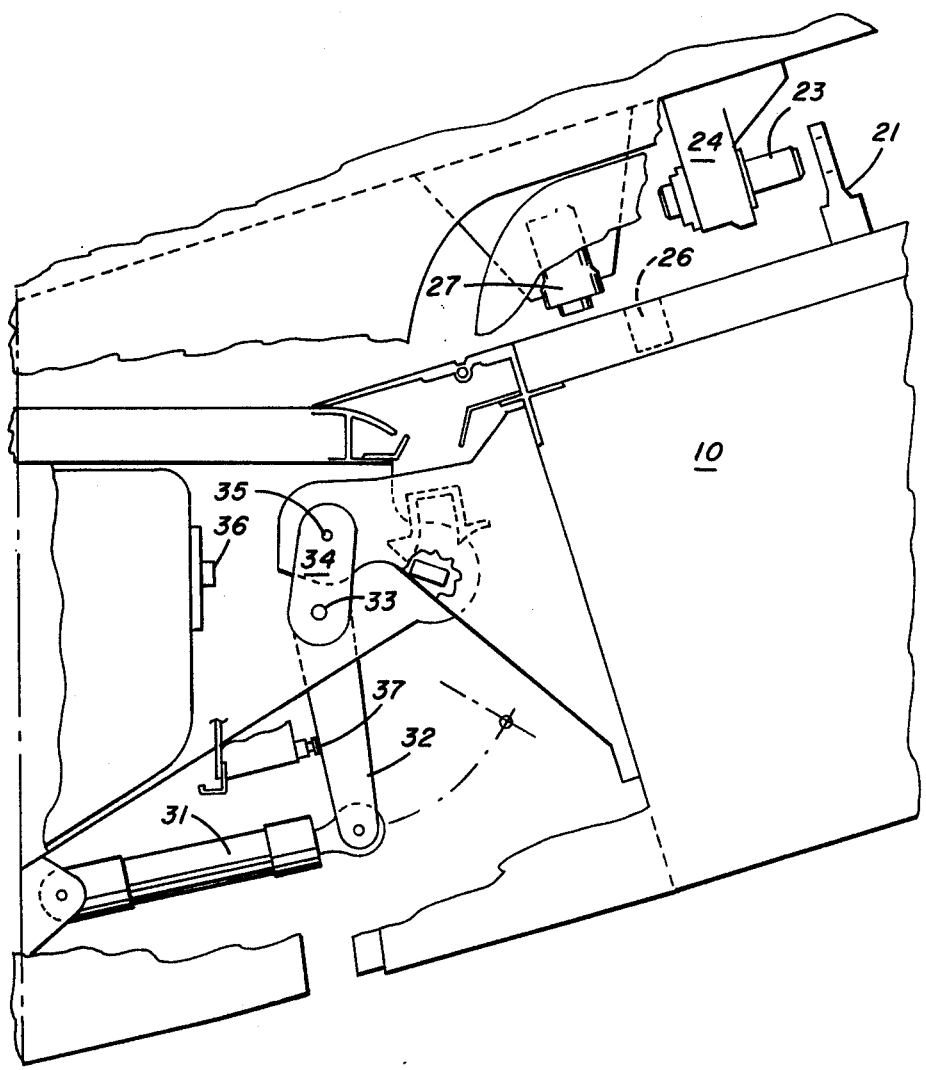
FIG. 4 is a view similar to FIG. 2 but illustrating the ramp door after repositioning in an aft position by translating motion into an unlocked position.

As noted hereinbefore, the present invention provides that the ramp door is locked and unlocked by a translating motion whereby the upstanding supports 21 are moved relative to the pins 23. The door is moved in an aft direction from the locked position shown in FIG. 2 by an actuator 31 typically in the form of a piston and cylinder assembly. The actuator is connected by a clevis mounting onto the fuselage of the aircraft and the rod end of the piston and cylinder assembly is coupled to an actuator arm 32. The free end of the actuator arm is secured to a torque shaft 33. The actuator 31 and actuator arm 32 are located generally along the center of the aircraft. Cranks 34 are secured to the right-hand and left-hand ends of the torque shaft and at symmetrical locations with respect to the crank arm 32. The torque shaft is supported by the aircraft for rotation about a horizontal axis which extends transversely to the aircraft. The free ends of cranks 34 are each connected by a hinge pin 35 to the forward end of the ramp door. In the closed position of the ramp door, the forward end thereof contacts a door stop 36 on the fuselage. When the actuator 31 is energized, the actuator arm 32 is pivotally displaced about the horizontal axis of torque shaft 33 into engagement with a stop member 37. Cranks 34 pivot about the same horizontal axis and bring about a repositioning of the hinge pin 35 from the position shown in FIG. 2 to a repositioning as shown in FIG. 4. This repositioning is a translating displacement of the ramp door in the aft direction which is sufficient in magnitude to disengage the supports 21 from the pins 23 at each side of the ramp door. The motion of the ramp door also brings about a repositioning of guide pin followers 38 located on the left-hand and right-hand sides of the ramp door. The followers 38 take the form of an inverted U-shaped guide to receive guide pins 39 by passing into a hollowed-out portion of the guides when the ramp door is lowered by operation of the ramp door actuator 14. The guide pins and followers provide a direct forward and aft load path between the ramp and the fixed structure for any ramp position between horizontal and a fold-down position. The forward and aft loads are imposed by the cargo loading and unloading.

The procedure for gaining access to the cargo door opening 12 follows depressurizing the aircraft and then pivotally repositioning cargo door 11 to an inward location within the aircraft. The ramp door shear fittings 25, if provided, are then retracted and the ramp actuator 14 is energized to lift the ramp door against a roller 40 located at the aft end of the ramp door (FIG. 1). This lifting motion of the ramp door which is relatively small, is used to unload the ramp support members of forces imposed on pins 23 by the ramp door via support members 21. The actuator 31 is then energized to move the ramp door is an aft direction and thereby disengages support members 21 from the support pins 23. The ramp door is then lowered by actuators 14. During the lowering operation, the guide pin followers 38 engage the guide pins 39.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In an aircraft having a fuselage with a cargo door opening therein, a ramp door to seal at least part of said opening including the combination of hinge means to pivotally connect said ramp door to the fuselage of the aircraft, stationary ramp support means carried by the fuselage at spaced-apart locations along each of opposite sides of said cargo door opening, stationary carrier members on said ramp door at spaced-apart locations along each of opposite sides thereof for interlocking engagement with said support means, and actuator means coupled with said hinge means to linearly translate the entire said ramp door including said stationary carrier members from a forward-door sealing position wherein said carrier members are interlocked with said ramp support means and into an unlocked aft position of said ramp door wherein said carrier members are slidingly disengaged from said ramp support means.

2. The aircraft according to claim 1 wherein said carrier members include upstanding hanger members.

3. The aircraft according to claim 1 wherein said ramp support means includes cylindrical pin members.

4. The aircraft according to claim 3 wherein said carrier members include upstanding hanger members each having an eyelet opening adapted to receive one of said cylindrical pin members.

5. The aircraft according to claim 1 wherein said hinge means includes a pivot shaft supported by said ramp door, and crank means supported by said fuselage to interconnect said pivot shaft and said actuator means.

6. The aircraft according to claim 5 wherein said crank means includes a torque shaft supported by said fuselage, and crank arms interconnecting said torque shaft and said pivot shaft.

7. The aircraft according to claim 6 wherein said crank means further includes an actuator crank interconnecting said torque shaft and said actuator means.

8. The aircraft according to claim 1 including the further combination of guide means supported by said ramp door, and a guide pin supported by said fuselage to engage said guide means for guiding said ramp door only during pivotal movement on the fuselage.

9. The aircraft according to claim 8 wherein said guide means includes a U-shaped guide pin follower secured to said ramp door, said guide pin follower being arranged for positioning into a guiding relation with said guide pin by the translating motion of said ramp door in response to repositioning by said actuator means.

10. The aircraft according to claim 1 including the further combination of retractable shear fittings supported by the fuselage of the aircraft, and means defining sockets supported by said ramp door for receiving said shear fittings.

11. The aircraft according to claim 1 including the further combination of stop means supported by the fuselage of the aircraft to support said ramp door while located in said forward-door sealing position.

12. The aircraft according to claim 1 including the further combination of an aft cargo door including aft hinge means pivotally connecting the aft cargo door to the fuselage for positioning the aft cargo door into an abutting relation with said ramp door to thereby close said cargo door opening.

13. The aircraft according to claim 12 including the further combination of actuator means to pivotally move said aft cargo door into said fuselage from an enclosing relation in the cargo door opening.

14. The aircraft according to claim 12 wherein said ramp door and said aft cargo door define a length when pivotally positioned into an end-to-end abutting relation essentially corresponding to the length of the cargo door opening to thereby inhibit translating motion of said ramp door by said actuator means until the aft cargo door is pivotally displaced from the cargo door opening.

* * * * *